United States Patent [19]
Mahant-Shetti et al.

[11] Patent Number: 5,646,877
[45] Date of Patent: Jul. 8, 1997

[54] HIGH RADIX MULTIPLIER ARCHITECTURE

[75] Inventors: Shivaling Mahant-Shetti, Dallas; Carl E. Lemonds, Garland, both of Tex.

[73] Assignee: Texas Instruments Incorporated, Dallas, Tex.

[21] Appl. No.: 451,091

[22] Filed: May 25, 1995

[51] Int. Cl.$^6$ .................................................. G06F 7/52
[52] U.S. Cl. .................................................. 364/760.01
[58] Field of Search ................................. 364/754, 757, 364/759, 760

[56] References Cited

U.S. PATENT DOCUMENTS

| | | | |
|---|---|---|---|
| 3,949,209 | 4/1976 | Fett | 364/757 |
| 4,173,789 | 11/1979 | Miura | 364/760 |
| 4,208,722 | 6/1980 | Rasala et al. | 364/760 |
| 4,745,570 | 5/1988 | Diedrich et al. | 364/760 |
| 4,864,529 | 9/1989 | Shah et al. | 364/760 |
| 4,926,371 | 5/1990 | Vassiliadis et al. | 364/760 |
| 5,008,850 | 4/1991 | Jensen | 364/760 |
| 5,426,599 | 6/1995 | Machida | 364/760 |
| 5,473,559 | 12/1995 | Makino | 364/758 |

FOREIGN PATENT DOCUMENTS

0326414A3  2/1989  European Pat. Off. .

OTHER PUBLICATIONS

"Improved Approach To The Use of Booth's Multiplication Algorithm"; IBM Technical Disclosure Bulletin, vol. 27 No. 11, Apr. 1985, pp. 6624–6632.

*Primary Examiner*—Paul P. Gordon
*Assistant Examiner*—Robert J. Dolan
*Attorney, Agent, or Firm*—Jacki J. Garner; W. James Brady, III; Richard L. Donaldson

[57] ABSTRACT

A multiplier and method of multiplying a multiplicand by a multiplier comprising providing a multiplicand of predetermined radix, preferably two, and a predetermined multiple of the multiplicand, preferably three, of the predetermined radix. First and second paths are provided, each path including the multiplicand and the multiple of the multiplicand. One of the multiplicand or multiple of the multiplicand in said first path is selected responsive to the value of the multiplier and one of the multiplicand or multiple of the multiplicand in the second path is selected responsive to the value of the multiplier. The selected multiplicand or multiple of the multiplicand in said first path is left shifted a number of shifts determined by the value of the multiplier and the selected multiplicand or multiple of the multiplicand in the second path is left shifted a number of shifts determined by the value of the multiplier. At least one of the shifted multiplicands or multiples thereof is then assigned one of a positive or negative value as determined by the value of the multiplier and the shifted values are then added together. The circuit also includes an encoder responsive to the value of the multiplier to control the selection of the multiplicand or multiple thereof, the left shifting and the assignment of a positive or negative value. The encoder can include a truth table to assist in performing this function.

24 Claims, 1 Drawing Sheet

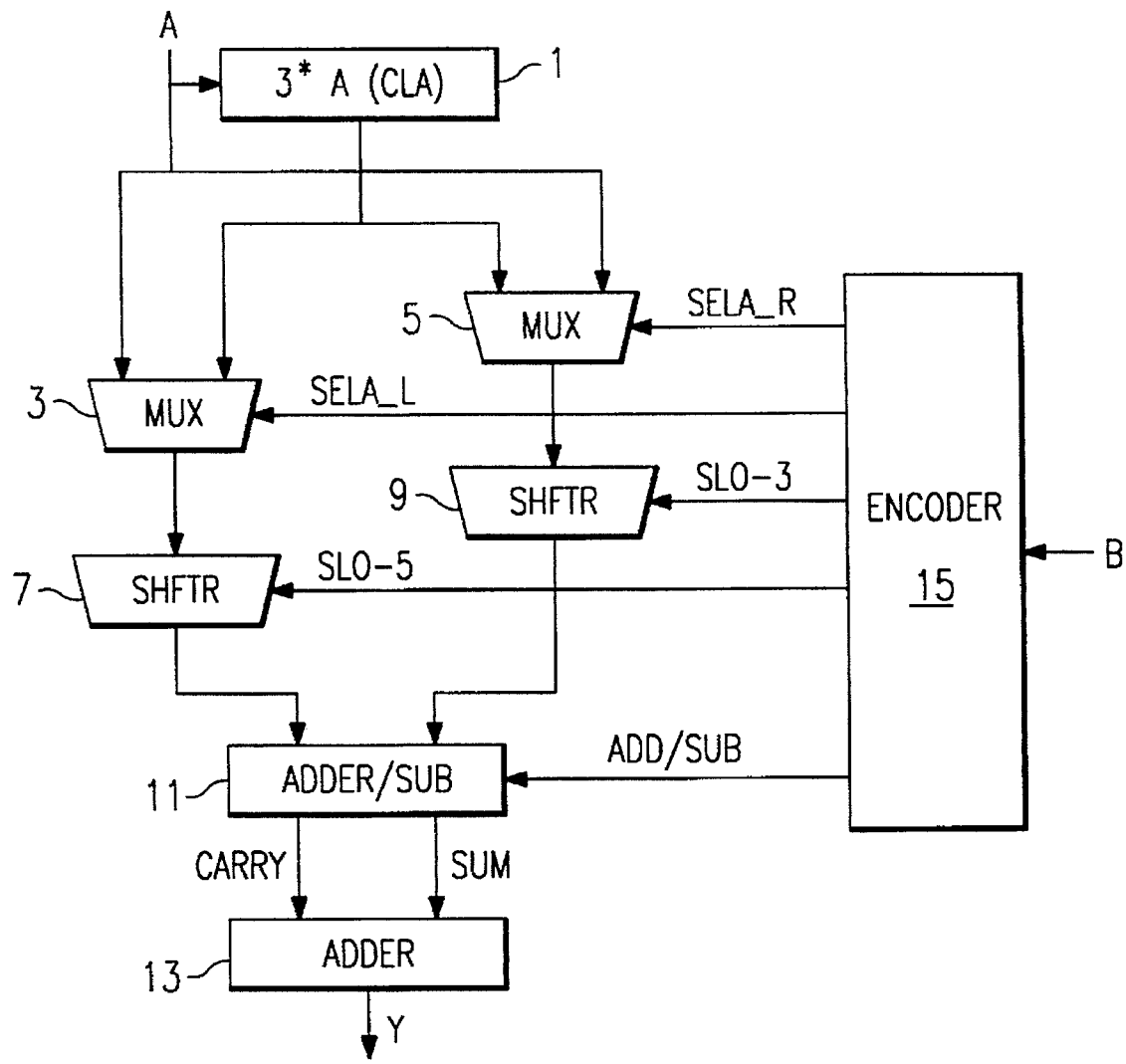

HIGH RADIX MULTIPLIER ARCHITECTURE

BACKGROUND OF THE INVENTION

1. Field of the Invention

This invention relates to digital multipliers and, more specifically, to an architecture for reducing the number of partial products to be added during a multiplication procedure.

2. Brief Description of the Prior Art

Multiplier designs have typically occupied significant chip area and often become an obstacle in meeting speed performance goals. In computing A * B=Y, a number of partial products are generated, this number of partial products being determined by the number of digits in the multiplier B. The partial products are then added to provide the result. There are basically two ways to speed up this multiply operation, these being to reduce the number of partial products to be added and/or to speed up the accumulation of partial product terms. The reduction in partial products is a difficult problem and generally translates into added hardware complexity and significant layout obstacles, primarily in the routing of signals. For the above stated reasons, designers have traditionally concentrated on increasing the speed of accumulation of partial products to meet multiplication speed performance goals.

When reduction in the number of partial products is of concern, Booth's algorithm as set forth in "A Signed Binary Multiplication Technique" by A. D. Booth, *Quart. J. Mech. Math.*, Vol. 4, part 2, 1951 is probably the most prevalent recoding scheme presently used in the design of multipliers. Its main thrust is in the reduction of partial products by skipping over consecutive "ones" in the multiplier term. This string recoding method looks at overlapping sets of bits in the multiplier term and recodes them to a multiple of the multiplicand term. The number of partial products required can be reduced by a factor of k where r=2 * k is the number radix as noted in *Computer Arithmetic Principles, Architecture and Design*, by Kai Hwang, Wiley and Sons, 1979. Though other recode schemes of the multiplier term are known in addition to Booth's algorithm and can be utilized herein, the focus herein will be limited to the Booth algorithm.

The Booth method for radix-2 looks at two bits (one bit plus one overlap bit) and selects the appropriate multiple of the multiplicand. The radix-2 recode method is shown in Table 1. Radix-2 does not actually reduce the number of partial products since one bit of the multiplier term is being encoded.

TABLE 1

| | Radix-2 Booth Recode | |
|---|---|---|
| bi | bi − 1 | Output |
| 0 | 0 | No string (0 * multiplicand) |
| 0 | 1 | End of string (1 * multiplicand) |
| 1 | 0 | Start of string (1 * Multiplicand) |
| 1 | 1 | Center of string (0 * multiplicand) |

The radix-4 Booth recode method looks at two bits plus one overlap bit. Radix-4 reduces the number of partial products by a factor of 2. Multipliers incorporating the radix-4 Booth recode method are quite common in present day multiplier designs. The radix-4 method is shown in Table 2.

TABLE 2

| | | Radix-4 Booth Recode | |
|---|---|---|---|
| bi + 1 | bi | bi − i | Output |
| 0 | 0 | 0 | No string (0 * multiplicand) |
| 0 | 0 | 1 | End of string (1 * multiplicand) |
| 0 | 1 | 0 | Single 1 (1 * multiplicand) |
| 0 | 1 | 1 | End of string (2 * multiplicand) |
| 1 | 0 | 0 | Start of string (−2 * multiplicand) |
| 1 | 0 | 1 | End/start of string (−1 * multiplicand) |
| 1 | 1 | 0 | Start of string (−1 * multiplicand) |
| 1 | 1 | 1 | Center of string (0 * multiplicand) |

Radix-8 reduces the number of partial products by a factor of 3. Radix-8 requires an extra adder to generate the 3 times multiplicand term. Additional interconnect also makes the radix-8 multiplier more difficult in layout. However, radix-8 multipliers have become quite popular in recent years due to the reduction factor. The radix-8 method is shown in Table 3.

TABLE 3

| | | | Radix-8 Booth Recode | | |
|---|---|---|---|---|---|
| bi + 2 | bi + 1 | bi | bi − i | Output | |
| 0 | 0 | 0 | 0 | No string | (0 * multiplicand) |
| 0 | 0 | 0 | 1 | End of string | (1 * multiplicand) |
| 0 | 0 | 1 | 0 | Single 1 | (1 * multiplicand) |
| 0 | 0 | 1 | 1 | End of string | (2 * multiplicand) |
| 0 | 1 | 0 | 0 | Start of string | (2 * multiplicand) |
| 0 | 1 | 0 | 1 | End/start of string | (3 * multiplicand) |
| 0 | 1 | 1 | 0 | Start of string | (3 * multiplicand) |
| 0 | 1 | 1 | 1 | Center of string | (4 * multiplicand) |
| 1 | 0 | 0 | 0 | Start of string | (−4 * multiplicand) |
| 1 | 0 | 0 | 1 | End/start of string | (−3 * multiplicand) |
| 1 | 0 | 1 | 0 | Start, Single 1 | (−3 * multiplicand) |
| 1 | 0 | 1 | 1 | End/start of string | (−2 * multiplicand) |
| 1 | 1 | 0 | 0 | Start of string | (−2 * multiplicand) |
| 1 | 1 | 0 | 1 | End/start of string | (−1 * multiplicand) |
| 1 | 1 | 1 | 0 | Start of string | (−1 * multiplicand) |
| 1 | 1 | 1 | 1 | Center of string | (0 * multiplicand) |

The tradeoff between hardware complexity and reduction in the number of partial products reaches a major obstacle at radix-16. Extra adders are required to generate the 3, 5, 6 and 7 times the multiplicand term (2, 4 and 8 being simple shifts of 1, 2 and 3 positions respectively). Also, the interconnect becomes increasingly difficult to route. The reduction factor of four is appealing, however the hardware/interconnect cost is high. Despite this problem, there are a few designs that incorporate the radix-16 multiplier, but they are rare.

In the case of higher radix multipliers, extra adders are required to generate the different multiples of the multiplicand term. In the case of radix-16, one through eight times the multiplicand is required with the negative of each multiple to be generated locally at each partial product stage. Two, four and eight are just simple left shifts of the multiplicand while three, five, six and seven each require an adder. The broadcast of each of these multiples through the multiplier array becomes very difficult in layout.

SUMMARY OF THE INVENTION

In accordance with the present invention, there is provided a multiplier architecture which can be fabricated with a minimum of adders. The idea of the novel multiplier architecture is to generate the maximum in multiplication power using a single adder since the adder takes up the most space and slows down operation.

Briefly, the above is accomplished by providing circuitry capable of receiving the multiplicand (A) and providing to other circuitry this multiplicand and a multiple, preferably a multiple of three (3 * A), of the multiplicand. The multiplier and multiple of the multiplier are both applied to a pair of multiplexers, the multiplexers each being separately controlled to transmit therethrough either the multiplicand (A) or the multiple of the multiplicand. The output of each multiplexer is fed to a separate controlled bit shifter which is controlled to left shift the output of the associated multiplexer from zero to "n" bit spaces. The outputs of the shifters are then added together or one is subtracted from the other under control to provide the result. The control of the multiplexers, shifters and add/subtract function is determined by the value of the multiplier which is fed to an encoder. From the value of the multiplier, either through circuitry or by a lookup table, the control of the multiplexers, shifters and add/subtract function are initially set so that the outputs of the shifters, when properly added together or one subtracted from the other will provide the result of the multiplication.

BRIEF DESCRIPTION OF THE DRAWING

The FIGURE is a schematic diagram of a multiplier in accordance with the present invention.

DESCRIPTION OF THE PREFERRED EMBODIMENT

Referring to the FIGURE, there is shown a multiplier architecture in accordance with the present invention for providing multiplication with the assumption that binary code is being utilized. The architecture includes a five bit left shifter 7 and a three bit left shifter 9. The multiplicand A or three times the multiplicand or 3 * A can be to fed to either or both of the shifters. A single add/subtract operation 11 is required at the outputs of the shifters. The multiplier is referred to as B.

Accordingly, the multiplicand A is initially operated upon in multiplier 1 to provide an output of 3 * A. This is accomplished therein by taking multiplicand A, left shifting (which is the same as multiplying by the radix which is two when binary coding is being used) and then adding the left shifted number to the original A to provide the result of 3 * A. Accordingly, the values A and 3 * A are now applied to each of multiplexers 3 and 5. The output of the multiplexer 3, which is either A or 3 * A, as determined by the signal from encoder 15 on line SELA_L, is applied to the five bit left shifter 7. Left shifter 7 multiplies either A or 3 * A by the radix 2 from zero to five times by left shifting A or 3 * A from zero to five bit values as determined by the signal from encoder 15 on line SLO-5. The output of the multiplexer 5, which is also either A or 3 * A, as determined by the signal from encoder 15 on line SELA_R, is applied to the three bit left shifter 9. Left shifter 9 multiplies either A or 3 * A by the radix 2 from zero to three times by left shifting A or 3 * A from zero to three bit values as determined by the signal from encoder 15 on line SLO-3. The signs of the outputs of the left shifters 7 and 9 are set by an adder/subtractor 11 under control of the signal from encoder 15 on the ADD/SUB line with the slum and carry therefrom being applied to an adder 13 which adds the outputs of the adder/subtractor 11 to provide the result of the multiplication Y.

The multiplexers 3 and 5, the left shifters 7 and 9 and the adder/subtractor 11 provide the specific one of their above enumerated possible functions under control of the encoder 15 which, in turn, provides the control signals therefrom in response to the value of the multiplier B fed thereto. The encoder can take many forms. Any typical form will recognize the value of the multiplier and, as a result thereof, provide a unique set of signals on the lines SELA_R, SELA_L, SLO-5, SLO-3 and ADD/SUB corresponding to the value of the multiplier. While several different combinations of signals from the encoder may provide the same result or number output, a typical truth table can be set up to provide signals to provide the following outputs from the shifters 7 and 9 for each possible multiplier number for a radix-32 operation wherein "SL" stands for the number of left shifts provided as represented by the number following the "SL" and "A" and "3A" represent the multiplicand and multiplicand multiplied by three respectively.

TRUTH TABLE

| Number | Shifter 7 | Shifter 9 |
| --- | --- | --- |
| 0 | SL0 A | −SL0 A |
| 1 | SL1 A | −SL0 A |
| 2 | SL0 A | +SL0 A |
| 3 | SL2 A | −SL0 A |
| 4 | SL1 A | +SL1 A |
| 5 | SL1 A | +SL0 3A |
| 6 | SL2 A | +SL1 A |
| 7 | SL2 A | +SL0 3A |
| 8 | SL2 A | +SL2 A |
| 9 | SL3 A | +SL0 A |
| 10 | SL3 A | +SL1 A |
| 11 | SL3 A | +SL0 3A |
| 12 | SL3 A | +SL2 A |
| 13 | SL0 A | +SL2 3A |
| 14 | SL1 A | +SL2 3A |
| 15 | SL4 A | −SL0 A |
| 16 | SL3 A | +SL3 A |
| 17 | SL4 A | +SL0 A |
| 18 | SL4 A | +SL1 A |
| 19 | SL4 A | +SL0 3A |
| 20 | SL4 A | +SL2 A |
| 21 | SL3 3A | −SL0 3A |
| 22 | SL3 3A | −SL1 A |
| 23 | SL3 3A | −SL0 A |
| 24 | SL2 3A | +SL2 3A |
| 25 | SL3 3A | +SL0 A |
| 26 | SL3 3A | +SL1 A |
| 27 | SL3 3A | +SL0 3A |
| 28 | SL3 3A | +SL2 A |
| 29 | SL5 A | −SL0 3A |
| 30 | SL5 A | −SL1 A |
| 31 | SL5 A | −SL0 A |

Table 4 shows the different multiples of A, the multiplicand, that can be generated by the architecture of FIG. 1 from shifter 7 and from shifter 9. SL0 is merely the passing through of the value A or 3 * A without any shifting. SL1 is a shift left of one bit, SL2 is a shift left of two bits, etc. A partial product range of 0 to 31 (radix-32) or 0 to 15 (radix-16) times the multiplicand can be achieved.

TABLE 4

Multiplicand multiples available from each shifter

| | From Shifter 7 | | From Shifter 9 | |
| --- | --- | --- | --- | --- |
| | A | 3 * A | A | 3 * A |
| SL0 | 1 | 3 | SL0 | 1 | 3 |
| SL1 | 2 | 6 | SL1 | 2 | 6 |
| SL2 | 4 | 12 | SL2 | 4 | 12 |
| SL3 | 8 | 24 | SL3 | 8 | 24 |
| SL4 | 16 | 48 | | | |
| SL5 | 32 | 96 | | | |

It can be seen that by appropriate signalling from the encoder 15 under control of the multiplier B fed thereto, the multiplexer 3 is controlled via the SELA_L line to pass therethrough to left shifter 7 A or 3 * A with shifter 7 then providing under control of the line SL0-5, which provides a left shift in left shifter 7 of from zero to five bits, any of the values shown in Table 4 under left shifter 7 to adder 13 via adder/subtractor 11. The multiplexer 5 is controlled via the SELA_R line to pass therethrough to shifter 9 A or 3 * A with left shifter 9 then providing under control of the line SL0-3, which provides a left shift in left shifter 9 of from zero to three bits, any of the values shown in Table 4 under left shifter 9 to adder 13 via adder/subtractor 11. Left shifter 7 can shift the signal thereto from zero to five shifts left and shifter 9 can shift the signal thereto from zero to three shifts left.

A comprehensive truth table that can be used as the encoder 15 is as follows in Table 5:

TABLE 5

| Multiple | Shifter 7 | Shifter 9 | SELA L | SL0-5 012345 | SELA R | SL0-3 | ADD/SUB |
|---|---|---|---|---|---|---|---|
| 0 | SL0 A | −SL0 A | 1 | 100000 | 1 | 1000 | 0 |
| 1 | SL1 A | −SL0 A | 1 | 010000 | 1 | 1000 | 0 |
| 2 | SL0 A | +SL0 A | 1 | 100000 | 1 | 1000 | 1 |
| 3 | SL2 A | −SL0 A | 1 | 001000 | 1 | 1000 | 0 |
| 4 | SL1 A | +SL1 A | 1 | 010000 | 1 | 0100 | 1 |
| 5 | SL1 A | +SL0 3A | 1 | 010000 | 0 | 1000 | 1 |
| 6 | SL2 A | +SL1 A | 1 | 001000 | 1 | 0100 | 1 |
| 7 | SL2 A | +SL0 3A | 1 | 001000 | 0 | 1000 | 1 |
| 8 | SL2 A | +SL2 A | 1 | 001000 | 1 | 0010 | 1 |
| 9 | SL3 A | +SL0 A | 1 | 000100 | 1 | 1000 | 1 |
| 10 | SL3 A | +SL1 A | 1 | 000100 | 1 | 0100 | 1 |
| 11 | SL3 A | +SL0 3A | 1 | 000100 | 0 | 1000 | 1 |
| 12 | SL3 A | +SL2 A | 1 | 000100 | 1 | 0010 | 1 |
| 13 | SL0 A | +SL2 3A | 1 | 100000 | 0 | 0010 | 1 |
| 14 | SL1 A | +SL2 3A | 1 | 010000 | 0 | 0010 | 1 |
| 15 | SL4 A | −SL0 A | 1 | 000010 | 1 | 1000 | 0 |
| 16 | SL3 A | +SL3 A | 1 | 000100 | 1 | 0001 | 1 |
| 17 | SL4 A | +SL0 A | 1 | 000010 | 1 | 1000 | 1 |
| 18 | SL4 A | +SL1 A | 1 | 000010 | 1 | 0100 | 1 |
| 19 | SL4 A | +SL0 3A | 1 | 000010 | 0 | 1000 | 1 |
| 20 | SL4 A | +SL2 A | 1 | 000010 | 1 | 0010 | 1 |
| 21 | SL3 3A | −SL0 3A | 0 | 000100 | 0 | 1000 | 0 |
| 22 | SL3 3A | −SL1 A | 0 | 000100 | 1 | 0100 | 0 |
| 23 | SL3 3A | −SL0 A | 0 | 000100 | 1 | 1000 | 0 |
| 24 | SL2 3A | +SL2 3A | 0 | 001000 | 0 | 0010 | 1 |
| 25 | SL3 3A | +SL0 A | 0 | 000100 | 1 | 1000 | 1 |
| 26 | SL3 3A | +SL1 A | 0 | 000100 | 1 | 0100 | 1 |
| 27 | SL3 3A | +SL0 3A | 0 | 000100 | 0 | 1000 | 1 |
| 28 | SL3 3A | +SL2 A | 0 | 000100 | 1 | 0010 | 1 |
| 29 | SL5 A | −SL0 3A | 1 | 000001 | 0 | 1000 | 0 |
| 30 | SL5 A | −SL1 A | 1 | 000001 | 1 | 0100 | 0 |
| 31 | SL5 A | −SL0 A | 1 | 000001 | 1 | 1000 | 0 |

As an example, to multiply the numbers 8 (binary 01000) by 8 (binary 01000), the value of A would be 01000 and the value of B would also be 01000. Initially, the encoder 15 would recognize that the multiplier is a binary 8 and, from the truth table above, provide a signal on the line SELA_L to select A rather than 3A and provide a signal on the line SL0-5 to shift the A signal to the left two bit spaces. Accordingly, the output of left shifter 7 will be binary 8 shifted two bit spaces to the left or 32. The encoder 15 would also provide from the truth table above a signal on the line SELA_R to select A rather than 3A and provide a signal on the line SL0-3 to shift the A signal to the left two bit spaces. Accordingly, the output of left shifter 9 will be binary 8 shifted two bit spaces to the left or 32. The encoder will also note that the output of the left shifter 9 is positive and thereby provide an add signal of the ADD/SUB line, causing the outputs of both left shifters 7 and 9 to be added in the adder, thereby providing an answer of 64 at Y.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A method of multiplying a multiplicand by a multiplier comprising the steps of:

(a) providing a multiplicand of predetermined radix and a predetermined multiple of said multiplicand of said predetermined radix;

(b) providing first and second paths, each path including said multiplicand and said multiple of said multiplicand;

(c) selecting one of said multiplicand or said multiple of said multiplicand in said first path responsive to the value of said multiplier;

(d) selecting one of said multiplicand or said multiple of said multiplicand in said second path responsive to the value of said multiplier;

(e) left shifting said selected multiplicand or multiple of said multiplicand in said first path a number of shifts determined by the value of said multiplier;

(f) left shifting said selected multiplicand or multiple of said multiplicand in said second path a number of shifts determined by the value of said multiplier; and (g) adding the results of steps (e) and (f).

2. The method of claim 1 wherein said predetermined radix is two and said predetermined multiple of said multiplicand is three.

3. The method of claim 1, further including providing an encoder responsive to the value of said multiplier to provide said steps of selecting in steps (c) and (d) and to provide said steps of left shifting in steps (e) and (f).

4. The method of claim 3 wherein said predetermined radix is two and said predetermined multiple of said multiplicand is three.

5. The method of claim 3 wherein said encoder includes a truth table responsive to the value of said multiplier.

6. The method of claim 5 wherein said predetermined radix is two and said predetermined multiple of said multiplicand is three.

7. The method of claim 1 wherein said step of adding includes the steps of assigning one of a positive or negative value to the result of at least one of steps (e) and (f) and then adding together the results of steps (e) and (f).

8. The method of claim 7 wherein said predetermined radix is two and said predetermined multiple of said multiplicand is three.

9. The method of claim 7, further including providing an encoder responsive to the value of said multiplier to provide said steps of selecting in steps (c) and (d), to provide said steps of left shifting in steps (e) and (f) and to provide said step of assigning one of a positive or negative value.

10. The method of claim 9 wherein said predetermined radix is two and said predetermined multiple of said multiplicand is three.

11. The method of claim 9 wherein said encoder includes a truth table responsive to the value of said multiplier.

12. The method of claim 11 wherein said predetermined radix is two and said predetermined multiple of said multiplicand is three.

13. A multiplier for multiplying a multiplicand by a multiplier comprising:
   (a) means for receiving a multiplicand of predetermined radix and a predetermined multiple of said multiplicand of said predetermined radix;
   (b) first and second paths, each path including:
      (i) means to select one of said multiplicand or said multiple of said multiplicand in said first path responsive to the value of said multiplier;
      (ii) means to select one of said multiplicand or said multiple of said multiplicand in said second path responsive to the value of said multiplier;
      (iii) means for left shifting said selected multiplicand or multiple of said multiplicand in said first path a number of shifts determined by the value of said multiplier;
      (iv) means for left shifting said selected multiplicand or multiple of said multiplicand in said second path a number of shifts determined by the value of said multiplier; and
   (c) means for adding the results of (iii) and (iv).

14. The multiplier of claim 13 wherein said predetermined radix is two and said predetermined multiple of said multiplicand is three.

15. The multiplier of claim 13, further including an encoder responsive to the value of said multiplier to control said means to select in (i) and (ii) and to control said means for left shifting in (iii) and (iv).

16. The multiplier of claim 15 wherein said predetermined radix is two and said predetermined multiple of said multiplicand is three.

17. The multiplier of claim 15 wherein said encoder includes a truth table responsive to the value of said multiplier.

18. The multiplier of claim 17 wherein said predetermined radix is two and said predetermined multiple of said multiplicand is three.

19. The multiplier of claim 13 wherein said means for adding includes means for assigning one of a positive or negative value to the result of at least one of (iii) and (iv) prior to said means for adding together the results of (iii) and (iv).

20. The multiplier of claim 19 wherein said predetermined radix is two and said predetermined multiple of said multiplicand is three.

21. The multiplier of claim 19, further including an encoder responsive to the value of said multiplier to control said means to select in (i) and (ii), to control said means for left shifting in (iii) and (iv) and to control said means for assigning one of a positive or negative value.

22. The multiplier of claim 21 wherein said predetermined radix is two and said predetermined multiple of said multiplicand is three.

23. The multiplier of claim 21 wherein said encoder includes a truth table responsive to the value of said multiplier.

24. The multiplier of claim 23 wherein said predetermined radix is two and said predetermined multiple of said multiplicand is three.

\* \* \* \* \*